(12) United States Patent
Kuwada et al.

(10) Patent No.: US 8,359,058 B2
(45) Date of Patent: Jan. 22, 2013

(54) MOBILE TERMINAL APPARATUS AND METHOD FOR PROCESSING A HANDOVER OF A MOBILE TERMINAL

(75) Inventors: Tsuguhisa Kuwada, Kawasaki (JP); Takasi Saitou, Kawasaki (JP); Hidenori Imagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 12/894,454

(22) Filed: Sep. 30, 2010

(65) Prior Publication Data

US 2011/0081931 A1 Apr. 7, 2011

(30) Foreign Application Priority Data

Oct. 1, 2009 (JP) ................................ 2009-229559

(51) Int. Cl.
*H04B 7/00* (2006.01)
*H04B 7/185* (2006.01)
*H04W 36/00* (2009.01)

(52) U.S. Cl. .......................... 455/522; 455/436; 370/318
(58) Field of Classification Search .................. 455/436, 455/522; 370/318
See application file for complete search history.

(56) References Cited

U.S. PATENT DOCUMENTS

| | | | | |
|---|---|---|---|---|
| 5,390,343 | A * | 2/1995 | Rupprecht et al. | 455/161.3 |
| 5,542,098 | A * | 7/1996 | Bonta | 455/434 |
| 5,678,185 | A * | 10/1997 | Chia | 455/437 |
| 6,496,492 | B1 | 12/2002 | Zeng | |
| 7,801,512 | B1 * | 9/2010 | Myr | 455/414.1 |
| 8,059,634 | B1 * | 11/2011 | Evans | 370/356 |
| 2005/0164706 | A1 * | 7/2005 | Wakabayashi | 455/441 |
| 2007/0129072 | A1 * | 6/2007 | Yamato et al. | 455/422.1 |
| 2007/0265010 | A1 * | 11/2007 | Fujita et al. | 455/436 |
| 2008/0049675 | A1 * | 2/2008 | Burgan et al. | 370/331 |
| 2008/0268786 | A1 * | 10/2008 | Baker et al. | 455/67.11 |
| 2009/0104911 | A1 * | 4/2009 | Watanabe et al. | 455/436 |
| 2010/0014474 | A1 | 1/2010 | Miki | |
| 2011/0263257 | A1 * | 10/2011 | Kago et al. | 455/436 |

FOREIGN PATENT DOCUMENTS

EP 1915011 4/2008
(Continued)

OTHER PUBLICATIONS

"Extended European Search Report" mailed by EPO and corresponding to European application No. 10179909.6 on Jan. 31, 2011.

(Continued)

*Primary Examiner* — Bobbak Safaipour
(74) *Attorney, Agent, or Firm* — Fujitsu Patent Center

(57) ABSTRACT

A mobile terminal apparatus includes a wireless communicator for communicating with a first wireless base station and a second wireless base station; and a controller. The controller measures a first signal quality and a second signal quality, the first signal quality being signal quality of a signal from the first wireless base station which is communicated with the communicator, the second signal quality being a signal quality of a signal received by the communicator from the second wireless base station, and executes a handover from the first wireless base station to the second wireless base station by controlling the communicator when the first signal quality is lower than the second signal quality and an integration value, along the time axis, of a difference between the first and the second signal qualities is more than a predetermined value.

6 Claims, 10 Drawing Sheets

FOREIGN PATENT DOCUMENTS

| | | |
|---|---|---|
| JP | 2000-078639 A | 3/2000 |
| JP | 2007-502558 A | 2/2007 |
| JP | 2008-092378 A | 4/2008 |
| WO | WO-91-19403 | 12/1991 |
| WO | WO2005-018241 | 2/2005 |
| WO | WO-2008/116028 | 9/2008 |

OTHER PUBLICATIONS

Choi, Chris C. et al., "Sequential Handoff Algorithm for Cellular Mobile Communication", Global Telecommunications Conference, 1997. GLOBECOM '97, IEEE Phoenix, AZ, USA Nov. 3-8, 1997, New York, NY, USA, IEEE, US, vol. 2, pp. 716-719.

* cited by examiner

MOBILE TERMINAL APPARATUS AND METHOD FOR PROCESSING A HANDOVER OF A MOBILE TERMINAL

CROSS-REFERENCE TO RELATED APPLICATION

This application is based upon and claims the benefit of priority of the prior Japanese Patent Application No. 2009-229559, filed on Oct. 1, 2009, the entire contents of which are incorporated herein by reference.

FIELD

The embodiment discussed herein is related to a mobile terminal apparatus and a method for processing a mobile terminal.

BACKGROUND

A mobile unit communication system can keep communication by properly switching the base stations communicating with a mobile terminal when the mobile terminal changes its location. Such switching control over base stations is called handover.

The mobile terminal monitors the receive signal quality from a base station currently communicating and the receive signal quality from base stations surrounding the base station communicating. The mobile terminal monitors different receive signal qualities from the base station communicating and surrounding base stations with the movement of the mobile terminal. The mobile terminal implements handover under the condition that the state that the receive signal quality from a surrounding base station is higher than the receive signal quality from the base station communicating continues for a preset period of time. (Refer to Japanese Laid-open Patent Publication No. 2007-502558 and Japanese Laid-open Patent Publication No. 2008-92378, for example.)

However, mobile terminals in the past determine the start of handover in accordance with whether the condition has been satisfied or not, irrespective of the degree of changes in communication qualities from the base station communicating and surrounding base station. Thus, when the receive signal quality from the base station communicating rapidly deteriorates due to the high velocity of the movement of the mobile terminal or influences of buildings, for example, the timing of handover may delay. Also when the receive signal quality from a surrounding base station rapidly increases, the timing of handover may delay. When the timing of handover delays, a signal from the surrounding base station becomes interference waves to the base station communicating. Then, the signal quality from the base station communicating may deteriorate. This prevents the communication between the mobile terminal and the base station, possibly resulting in call disconnection in the mobile terminal.

In order to control so as to change the handover start condition in accordance with the pattern of changes in the surrounding environment, a handover start threshold value or offset value has been set for each pattern in mobile terminals in the past. This however has increased the capacity of the memory area for pre storing the handover start threshold values or offset values.

SUMMARY

According to an aspect of the invention, an apparatus includes a wireless communicator for communicating with a first wireless base station and a second wireless base station, and a controller. The controller measures a first signal quality and a second signal quality, the first signal quality being signal quality of a signal from the first wireless base station which is communicated with the communicator, the second signal quality being a signal quality of a signal received by the communicator from the second wireless base station, and executes a handover from the first wireless base station to the second wireless base station by controlling the communicator when the first signal quality is lower than the second signal quality and an integration value, along the time axis, of a difference between the first and the second signal qualities is more than a predetermined value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

With reference to drawings, an embodiment will be described below. A mobile terminal 100 of an embodiment monitors the area of the region enclosed by at least a waveform of the receive signal quality from the base station communicating and a waveform of the receive signal quality from the surrounding base stations and determines whether a handover start condition is satisfied or not in accordance with values regarding the area. The mobile terminal 100 will be described that starts handover if a handover start condition is satisfied. According to this embodiment, the values regarding the area are the area value and a preset threshold value. The handover is started if the area value exceeds the preset threshold value.

Figure 1:
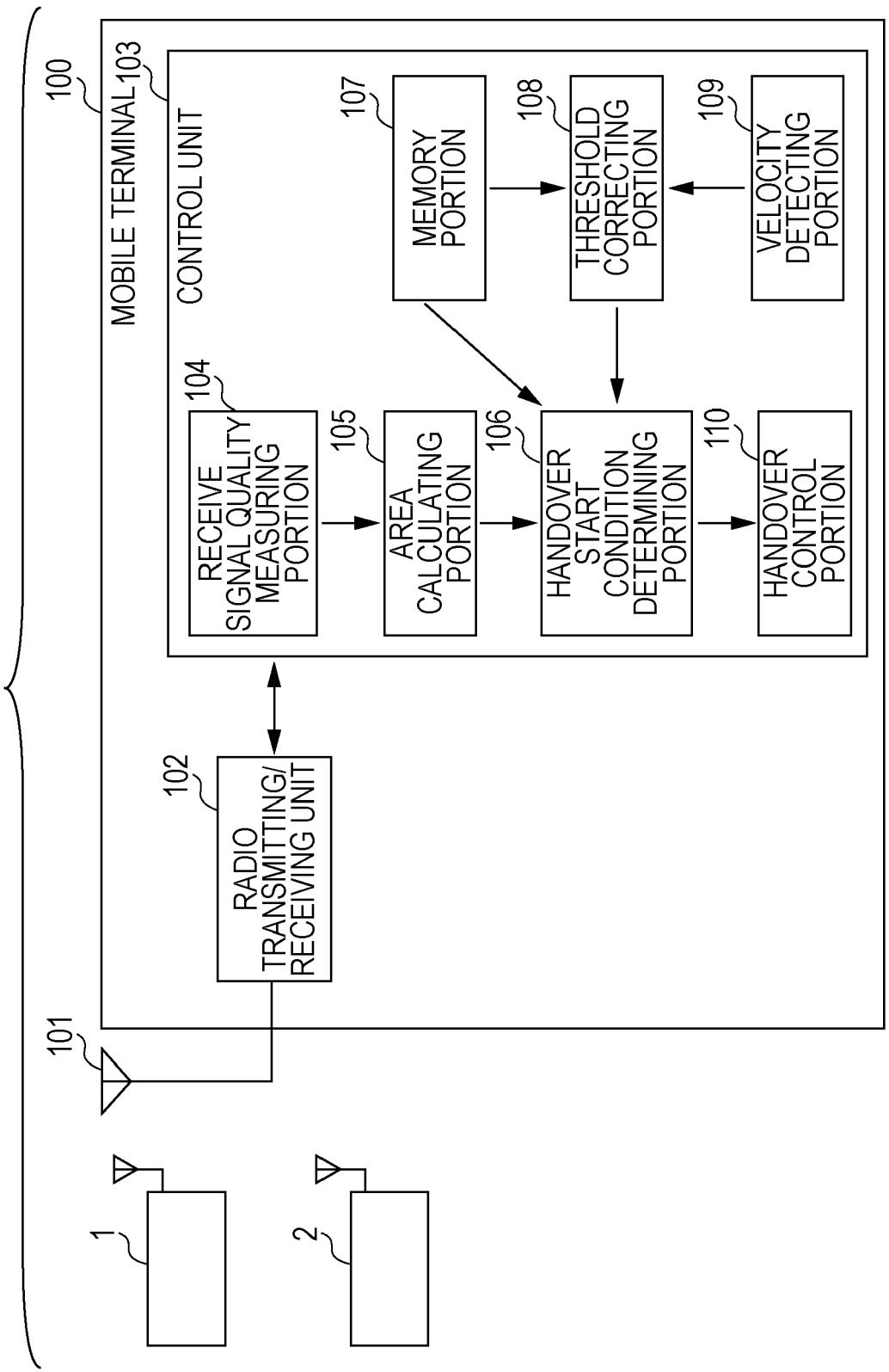
FIG. 1 illustrates an example of a mobile terminal according to an embodiment.

FIG. 1 illustrates an example of the mobile terminal 100 according to this embodiment. The mobile terminal 100 performs radio communication with a radio base station (simply called "base station" below). FIG. 1 illustrates examples of the base station including a base station 1 and a base station 2 neighboring to the base station 1. The base stations 1 and 2 establish a communication path for communication to and from the mobile terminal 100 present in the range (called a cell) that radio waves from the stations can reach. The cell of the base station 1 and the cell of the base station 2 are neighboring to each other. The mobile terminal 100 at some positions can receive both of a signal from the base station 1 and a signal from the base station 2.

The mobile terminal 100 includes a radio transmitting/receiving unit 102 connected to a transmission and reception antenna 101 and a control unit 103 connected to the radio transmitting/receiving unit 102. The mobile terminal 100 establishes a communication path to and from one of the base stations 1 and 2. The mobile terminal 100 may establish a communication path to and from the base station 1, for example, for communication with the base station 1. The radio transmitting/receiving unit 102 generates a signal to be transmitted to the base station 1. The generated signal is transmitted as a radio signal through the transmission and reception antenna 101.

On the other hand, the radio transmitting/receiving unit 102 receives a signal from the base station 1 through the transmission and reception antenna 102 and transmits it to the control unit 103. The radio transmitting/receiving unit 102 in communication with the base station 1 receives a signal from the base station 2 and transmits it to the control unit 103 through the transmission and reception antenna 101. Hereinafter, the base station 1 is assumed as a base station communicating with the mobile terminal 100, that is, a base station communicating and the base station 2 as a base station not-communicating that can receive a signal while the mobile terminal 100 is communicating with the base station communicating, for the following descriptions.

The control unit 103 determines handover start that switches the base station to communicate from the base station 1 to the base station 2 on the basis of the receive signal quality from the base station 1 being the base station communicating and the receive signal quality from the base station 2 being a base station not-communicating.

The control unit 103 includes a receive-signal-quality measuring portion 104 that is a measuring portion, an area calculating portion 105 that is an arithmetic portion and a memory portion 107 that is a storing portion. The control unit 103 further includes a handover-start-condition determining portion 106 that is a determining portion, a threshold correcting portion 108 that is a correcting portion, a movement velocity detecting portion 109 that is a detecting portion, and a handover control portion 110.

The receive-signal-quality measuring portion 104 measures quality values indicating the qualities of receive signals received from the base stations 1 and 2 every measuring period and holds the history. The quality of a receive signal may be, for example, a received power of a receive signal, a propagation loss indicating the difference between a transmitted power from a base station and a received power at the mobile terminal 100 or signal-to-interference wave ratio (SIR). In this example, a received power is a criterion for receive signal quality. When the receive signal quality from the base station 2 exceeds the receive signal quality from the base station 1, the receive-signal-quality measuring portion 104 gives the current and subsequent measurement results of the receive signal quality to the area calculating portion 105 and instructs to measure the area.

That is, the area shows an integrated value along the time axis of a difference between the signal qualities from the base station 1 and base station 2.

On the basis of the measurement results of receive signal qualities from the base stations 1 and 2 which are received from the receive-signal-quality measuring portion 104, the area calculating portion 105 performs the following processing.

First of all, if the receive signal quality from the base station 2 exceeds the receive signal quality from the base station 1, the area calculating portion 105 detects a base point that is a point in time where a waveform (first waveform) exhibiting time variations of the receive signal quality from the base station 1 and a waveform (second waveform) exhibiting time variations of the receive signal quality from the base station 2 cross. The area calculating portion 105 further calculates the area of the region enclosed by two waveform parts after the base point and a virtual straight line (called a "time straight line") crossing those two waveform parts and being perpendicular to a time axis moving in the forward direction with a lapse of time.

The handover-start-condition determining portion 106 compares the area acquired by the area calculating portion 105 and an area threshold value pre stored in the memory portion 107 or a corrected area threshold value given by the threshold correcting portion 108. If the area is equal to or larger than the area threshold value, the handover-start-condition determining portion 106 determines that the handover start condition is satisfied and gives a start instruction to the handover control portion 110.

The handover control portion 110 further performs a predetermined handover routine in accordance with the start instruction. In other words, the handover control portion 110 performs disconnection processing on the base station 1 being the base station communicating while performing connection processing on the base station 2.

The movement velocity detecting portion 109 detects the velocity of travel of the mobile terminal 100. For example, the movement velocity detecting portion 110 may be implemented by an acceleration sensor. Alternatively, the movement velocity detecting portion 109 may be implemented by using a global positioning system (GPS) to calculate the velocity of travel from the time variations of the position of the mobile terminal 100.

The threshold correcting portion 108 reads a threshold value stored in the memory portion 107, corrects the threshold value in accordance with the velocity of travel detected by the movement velocity detecting portion 109 and gives the corrected threshold value to the handover-start-condition determining portion 106.

The movement velocity detecting portion 109 and threshold correcting portion 108 are optional and may be omitted. The mobile terminal 100 has an ON/OFF switch, not shown, for the movement velocity detecting portion 109 and threshold correcting portion 108. If the ON/OFF switch is turned on, the threshold value corrected in accordance with the velocity of travel by the threshold correcting portion 108 is given to the handover-start-condition determining portion 106. On the other hand, if the ON/OFF switch is turned off, the handover-start-condition determining portion 106 uses the threshold value stored in the memory portion 107 to perform the determining processing.

Each block included in the control unit 103 may be implemented by a special hardware circuit, for example. Alternatively, blocks excluding the memory portion 107 may be functions to be implemented by execution of programs stored in a recording medium such as a semiconductor memory and a hard disk by a processor (computer) such as a central processing unit (CPU) and a digital signal processor (DSP). The memory portion 107 may be implemented by a recording medium such as a semiconductor memory and a hard disk. The recording medium may include a disk recording medium and a portable recording medium such as a portable semiconductor memory.

Figure 2:
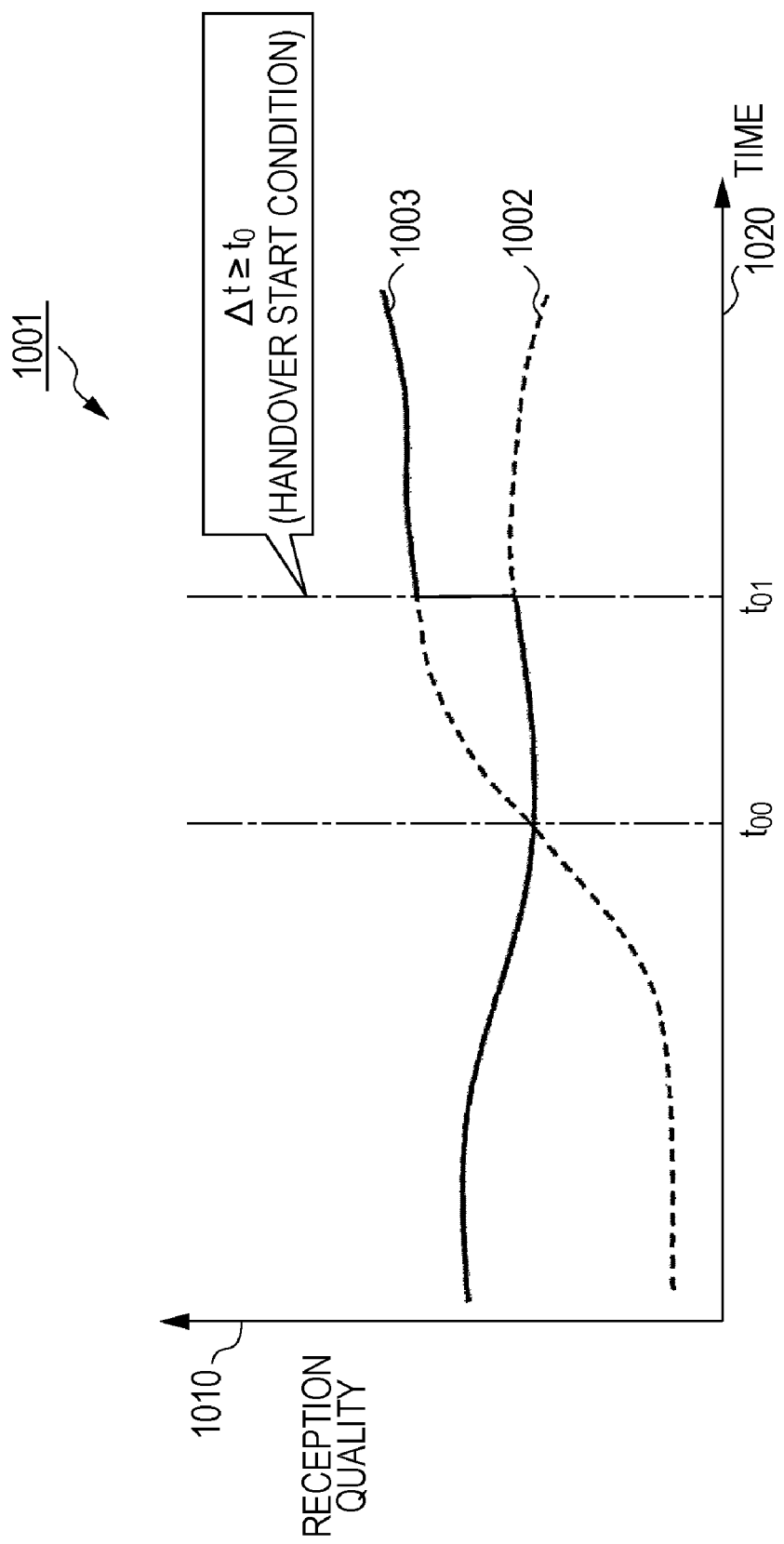
FIG. 2 is an explanatory diagram illustrating a comparison example of handover control.
Figure 3:
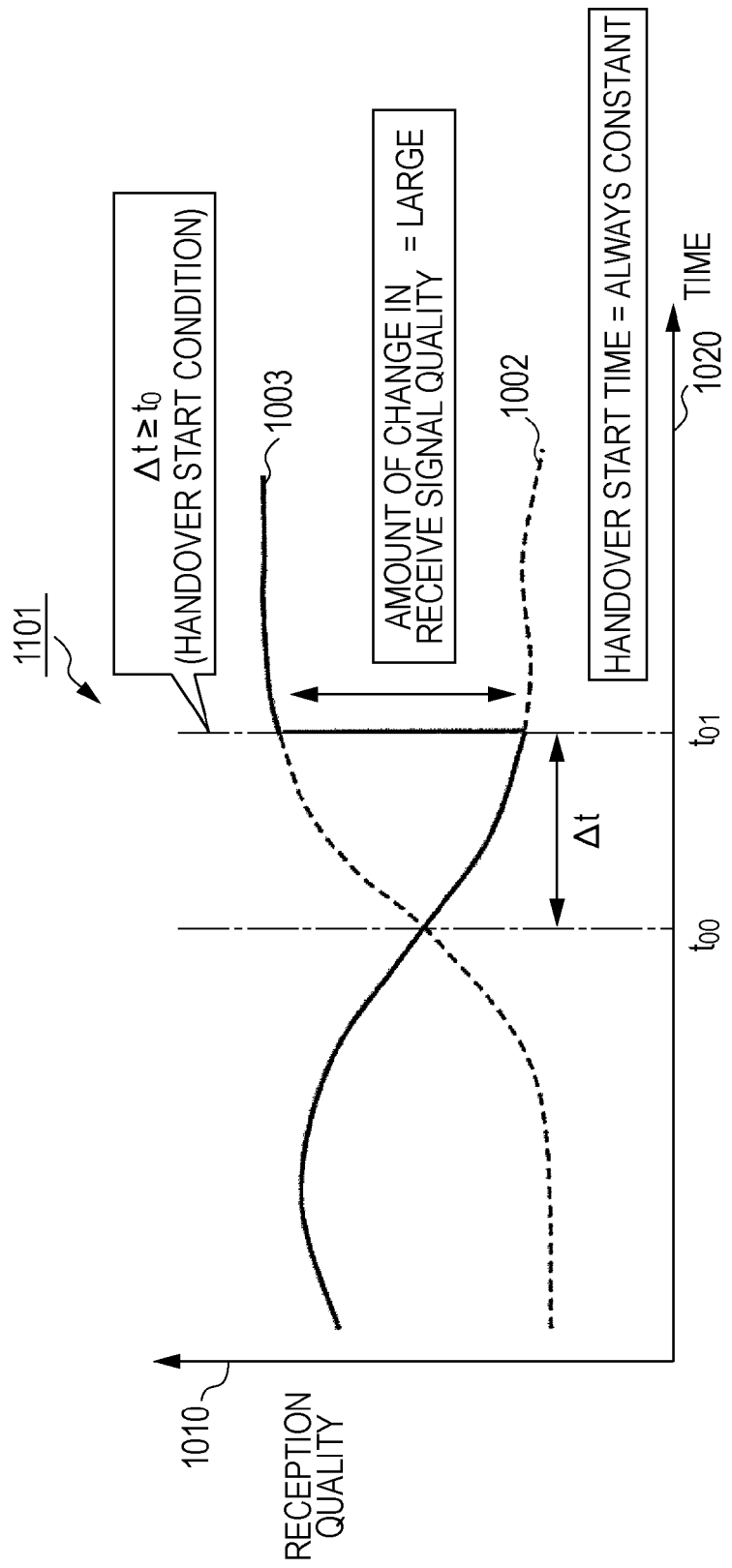
FIG. 3 is an explanatory diagram illustrating a comparison example of handover control and illustrates rapid changes in receive signal qualities.

FIGS. 2 and 3 illustrate comparison examples of the handover control and illustrate the condition for starting the handover in accordance with the states of the receive signal qualities 1002 and 1003 from the base station 1 and base station 2. The vertical axis 1010 of graphs 1001 and 1101 illustrated in FIGS. 2 and 3 indicates the quality (such as received power) of receive signals received from base stations, and the horizontal axis indicates time 1020.

It is assumed that the mobile terminal 100 is first communicating with the base station 1. A timer $t_0$ for starting handover is set as a handover start condition. If, with the movement of the mobile terminal 100, the quality of the receive signal received from the base station 2 exceeds the quality of the receive signal received from the base station 1 at a time $t_{00}$, and a time $\Delta t$ that the state is kept exceeds the time designated in the handover start timer $t_0$, the handover start condition is satisfied. Then, the mobile terminal performs handover from the base station 1 to the base station 2 at a time $t_{01}$.

The handover control in the comparison example may become an interference wave with rapid changes in receive signal qualities 1002 and 1003 from the base station communicating (base station 1) and a surrounding base station (base station 2) as illustrated in FIG. 3. In other words, in this case, the handover control in the comparison example may become an interference wave because the receive signal quality from the base station 2 exceeds the receive signal quality from the base station 1 at the time $t_{01}$ when the handover start condition is satisfied. This may cause deterioration of the receive signal quality or call disconnection due to the failure of the handover because of a transmission and reception error of a call control signal.

Figure 4:
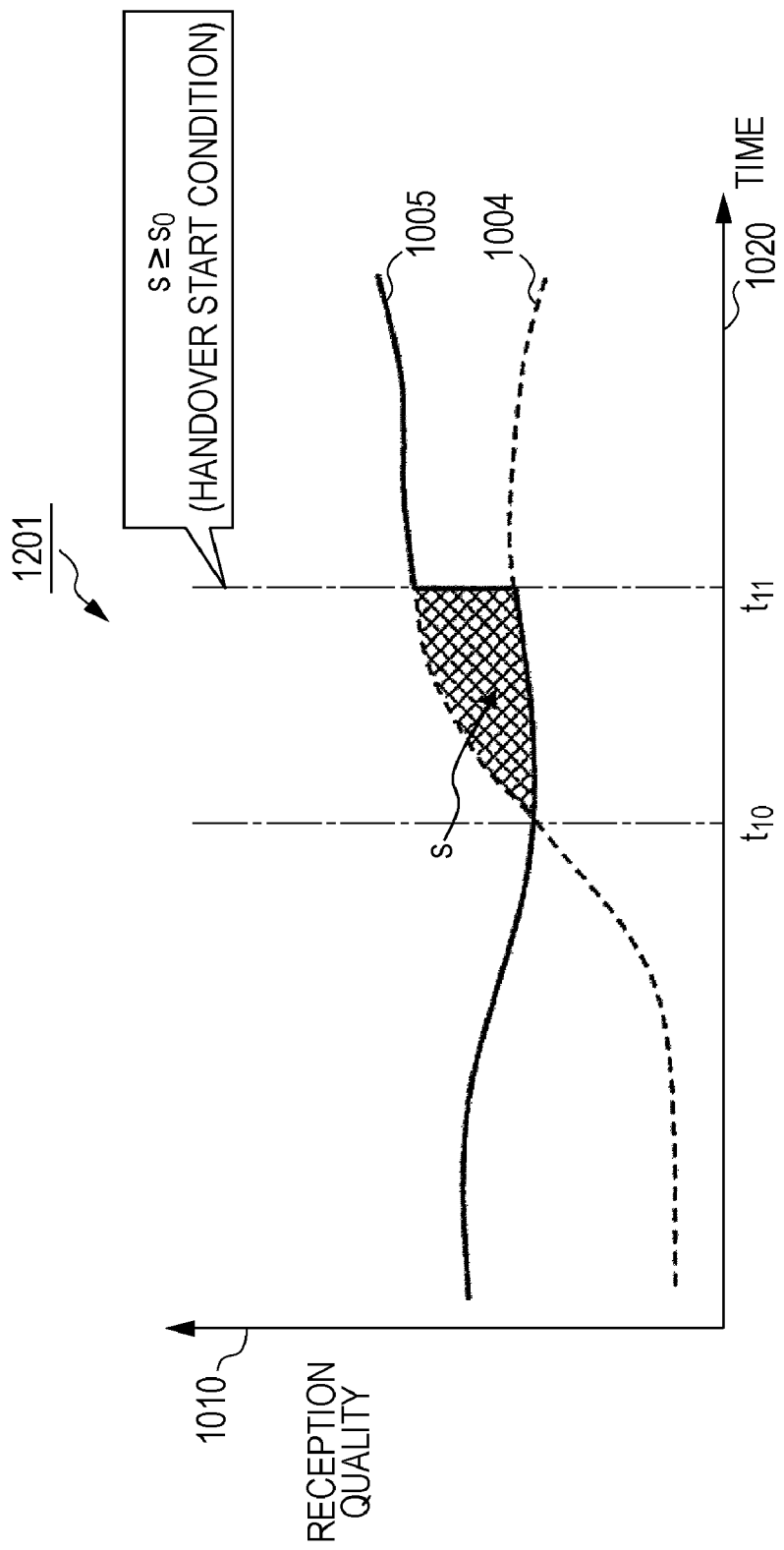
FIG. 4 is an explanatory diagram illustrating an example of handover control in a mobile terminal according to the embodiment.
Figure 5:
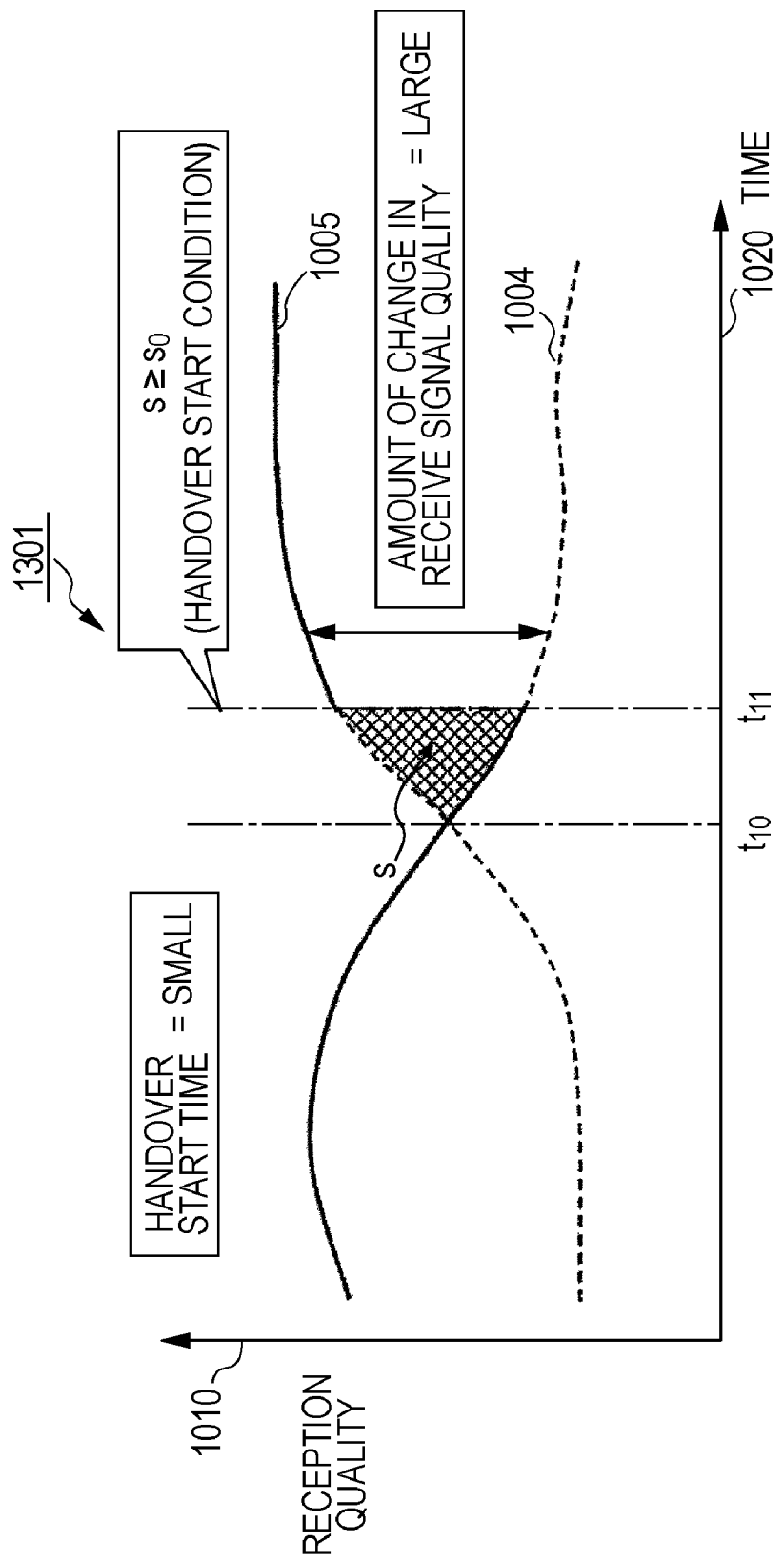
FIG. 5 is an explanatory diagram illustrating an example of handover control in a mobile terminal according to the embodiment and illustrates rapid changes in receive signal qualities.
Figure 6:
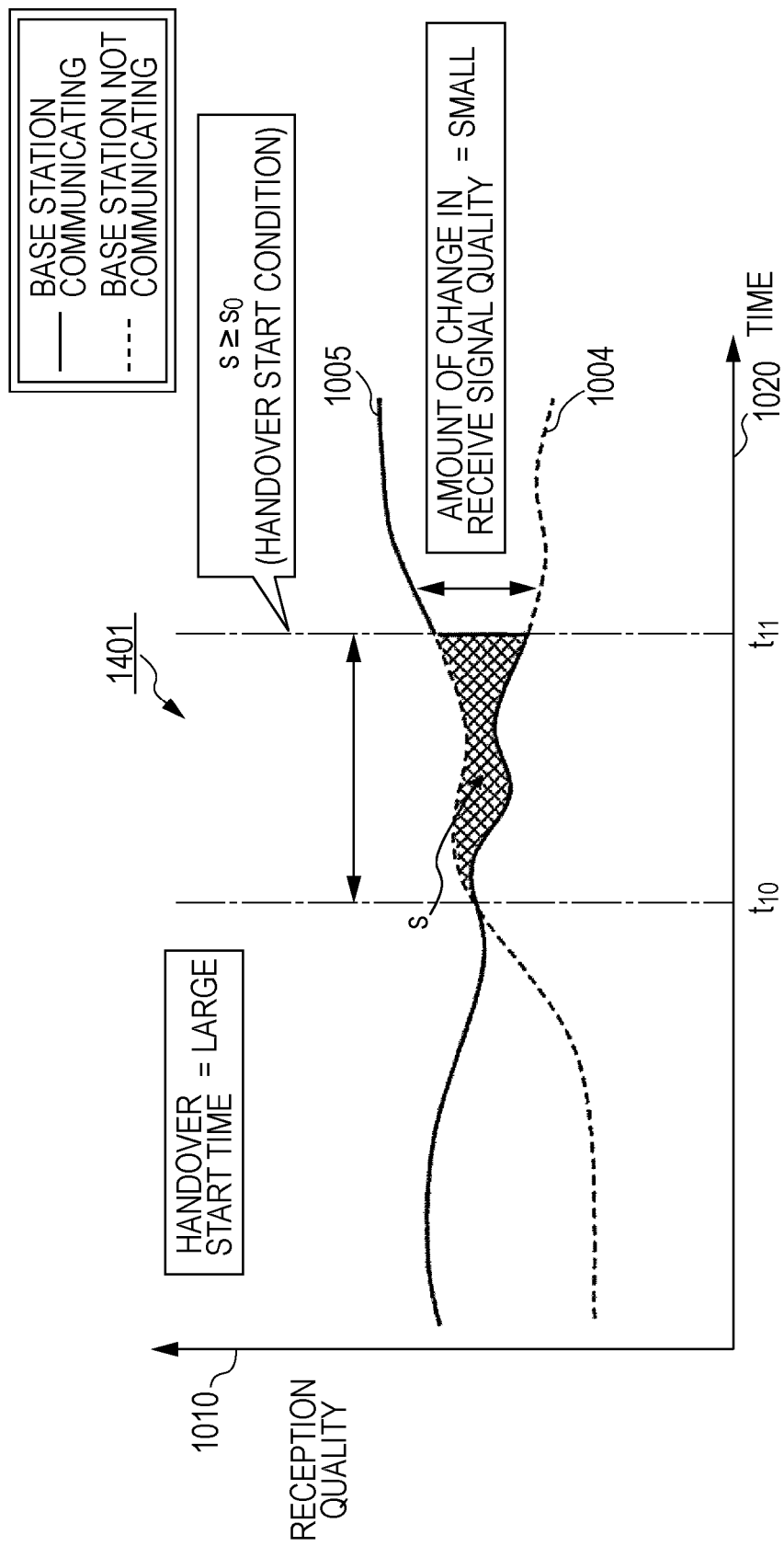
FIG. 6 is an explanatory diagram illustrating an example of handover control in a mobile terminal according to the embodiment and illustrates mild changes in receive signal qualities.

FIGS. 4, 5 and 6 illustrate examples of handover control in the mobile terminal 100. The vertical axes in graphs 1201, 1301 and 1401 in FIGS. 4, 5 and 6, respectively, indicate quality 1010 (such as received power) of receive signals received from the base stations 1 and 2, and the horizontal axes indicate time 1020. The graphs have on the same time axis a waveform (first waveform) 1004 exhibiting time variations of the receive signal quality from the base station 1 and a waveform (second waveform) 1005 exhibiting time variations of the receive signal quality from the base station 2.

It is assumed that the mobile terminal 100 is first communicating with the base station 1. An area threshold value $s_0$ for handover start is pre-stored as a handover start condition in the memory portion 107.

The area calculating portion 105 in the mobile terminal 100 starts measuring the area s of the region enclosed by the waveforms and the time straight line L (indicated by alternate long and short dashed lines) from the point in time (time $t_{10}$) when the quality 1005 of the receive signal received from the base station 2 is equal to or higher than the receive signal quality 1004 received from the base station 1. The handover-start-condition determining portion 106 monitors the measured area s. The time straight line L horizontally moves toward the future with a lapse of time. The area s with a lapse of time increases unless the receive signal qualities 1004 and 1005 are not reversed again.

At the point in time (time $t_{11}$) when the area s is equal to or higher than the area threshold value $s_0$ for handover start, the handover-start-condition determining portion 106 starts the handover control portion 110 to perform handover from the base station 1 to the base station 2.

According to this embodiment, as illustrated in FIG. 5, the speed of increase of the area s increases with rapid deterioration of the receive signal quality 1004 from the base station communicating (base station 1) or rapid increase of receive signal quality 1005 from a surrounding base station (base station 2), that is, with a rapid increase in difference between the reversed receive signal qualities 1004 and 1005. Thus, the period for the increase of the area s up to the area threshold value $s_0$ can be reduced. In the example illustrated in FIG. 5, the difference is increasing rapidly, and the period of time from the time $t_{10}$ to the time $t_{11}$ is reduced, compared with the example illustrated in FIG. 4.

In this way, rapid increases in difference between the receive signal qualities 1004 and 1005 increase the period of time until the handover start condition ($s \geq s_0$) is satisfied. Comparing with the comparison examples (FIGS. 2 and 3), handover start can be performed earlier.

On the other hand, as illustrated in FIG. 6, mild time variations of the receive signal quality 1004 from the base station communicating (base station 1) and mild time variations of the receive signal quality 1005 from a surrounding base station (base station 2) extend the period of time until the handover start condition ($s \geq s_0$) is satisfied. This can suppress miss operations involved in the handover, and stable communication quality can be kept in accordance with the surrounding environment.

Figure 7:
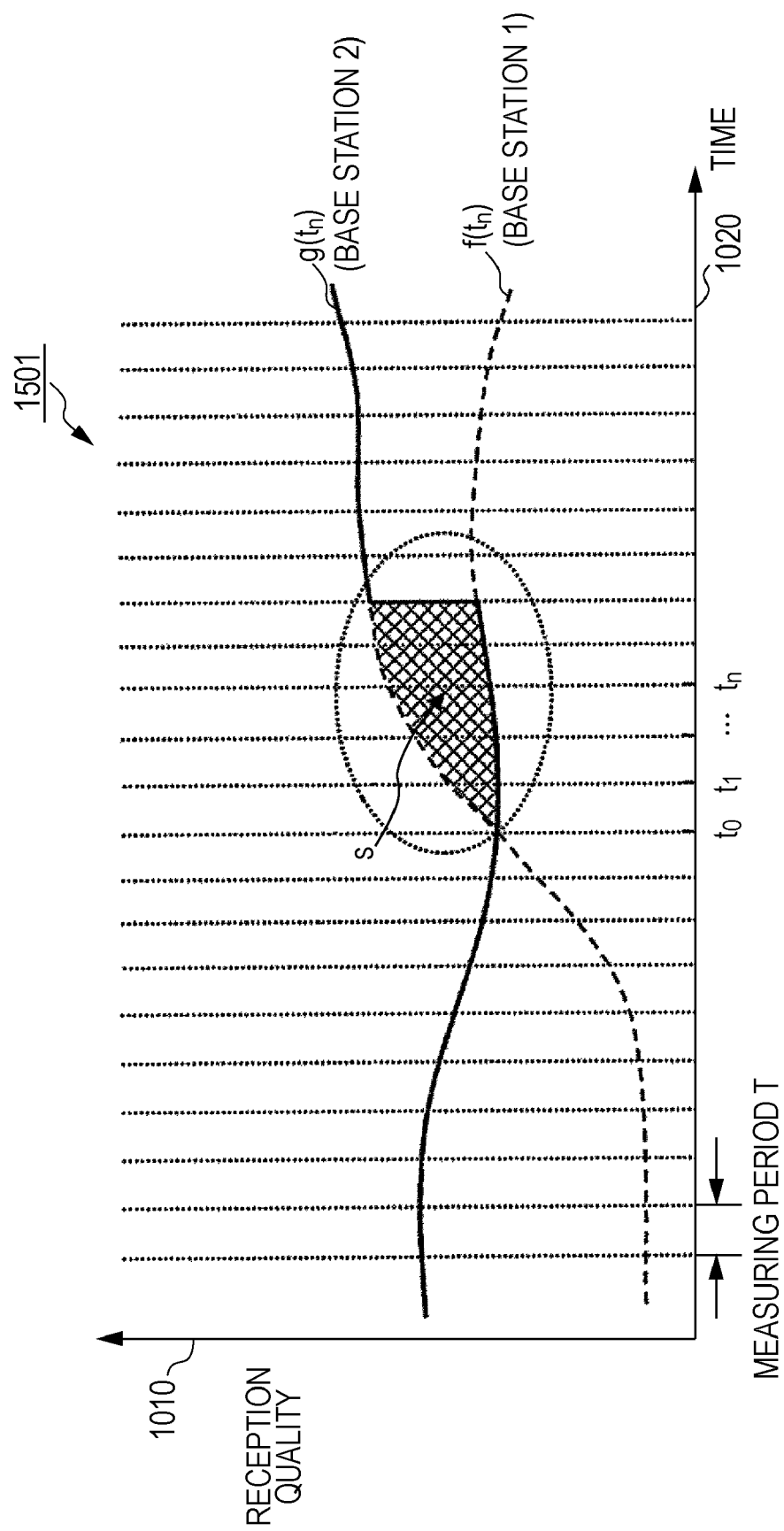
FIG. 7 illustrates an example of area calculation.
Figure 8:
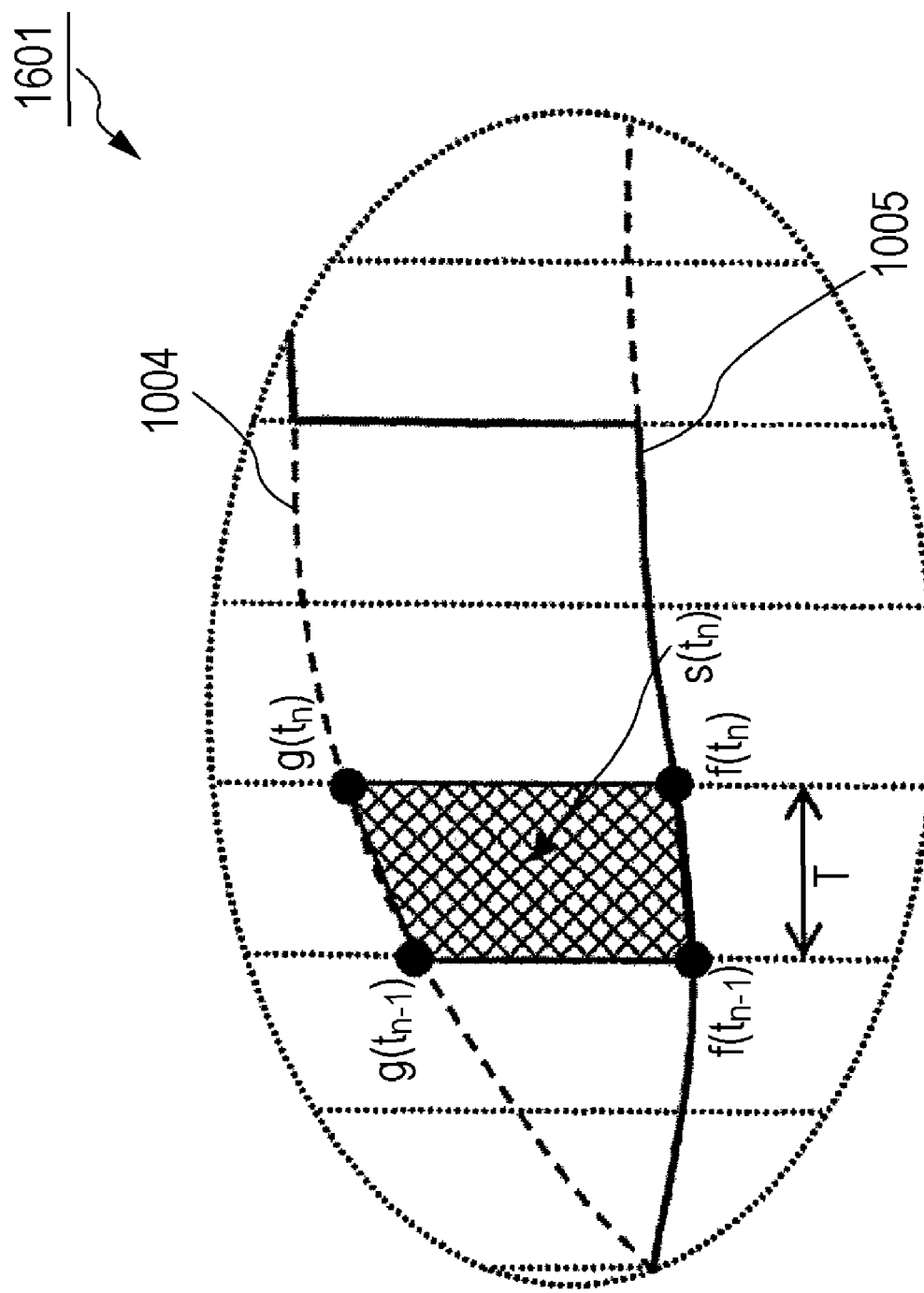
FIG. 8 illustrates the example of area calculation.

FIGS. 7 and 8 illustrate examples of calculation of areas by the area calculating portion 105. FIG. 8 illustrates on a graph 1601 the details of the part within the ellipse on a graph 1501 in FIG. 7. The area s may be acquired by calculating a trapezoidal area by using an approximate straight line, as follows.

The receive signal quality 1004 from the base station 1 and receive signal quality 1005 from the base station 2 at a time $t_n$ are defined as $f(t_n)$ and $g(t_n)$, for example. The area of the region enclosed by receive signal quality waveforms in the period between a time $t_{n-1}$ and the time $t_n$ is defined as $s(t_n)$. The predefined measuring period for measuring the receive signal quality from the surrounding base stations 1005 in the mobile terminal 100 is defined as T. The time straight line L moves in the forward direction every measuring period T. On the basis of these definitions, the partial area $s(t_n)$ can be acquired by the following approximate Expression 1.

$$s(t_n) \approx \frac{(g(t_{n-1}) - f(t_{n-1}) + g(t_n) - f(t_n)) \times T}{2} \quad (1)$$

Thus, the area s of the region enclosed by the waveform of the receive signal quality 1004 from the base station 1 and the waveform of the receive signal quality 1005 from the base station 2 from the time $t_0$ when the receive signal quality 1005 from the base station 2 exceeds the receive signal quality 1004 from the base station 1 to the time t can be acquired by:

$$s = \sum_{i=0}^{n} s(t_i) \quad (2)$$

In other words, the area s is accumulated value of the partial area $s(t_n)$ measured in the measuring periods T.

If the value of the area s acquired by Expression 2 is equal to or higher than predefined area threshold value $s_0$, the mobile terminal 100 starts handover from the base station 1 to the base station 2.

Figure 9:
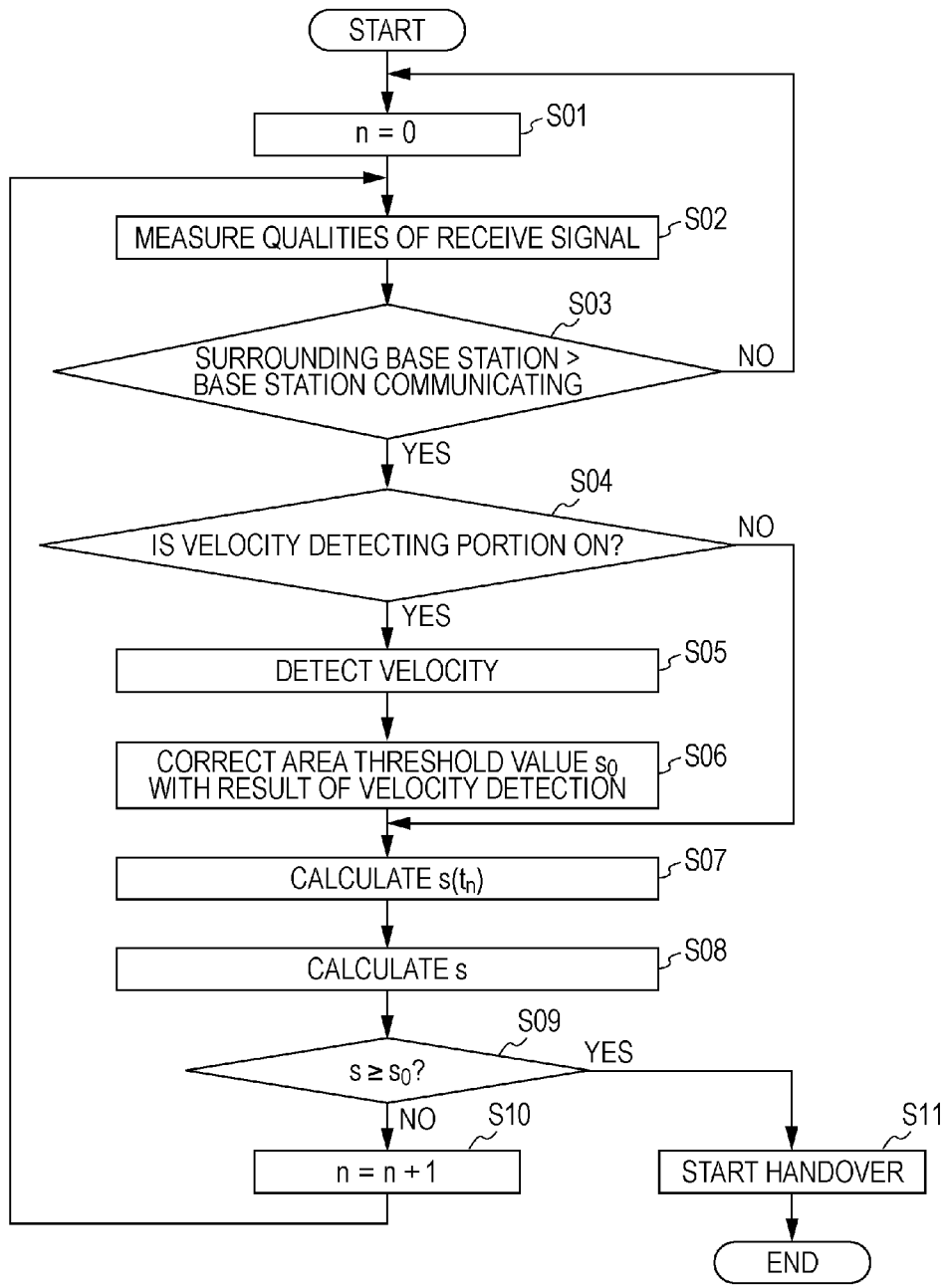
FIG. 9 is a flowchart illustrating an example of processing by a control unit in a mobile terminal according to the embodiment.

FIG. 9 is a flowchart illustrating a control example over determination on handover start by the control unit 103. The start of the processing illustrated in FIG. 9 may be triggered by the start of communication between the mobile terminal 100 and the base station 1, for example.

First of all, the control unit 103 sets the value n at the time t indicating a measuring period T to zero (step S01). Next, the receive-signal-quality measuring portion 104 measures the receive signal qualities from the base station 1 and base station 2 at a time $t_0$ (step S02). The receive-signal-quality measuring portion 104 determines whether the value of the receive signal quality 1005 from the base station 2 being a surrounding base station is higher than the value of the receive signal quality 1004 from the base station 1 being the base station communicating or not (step S03).

If not (NO in step S03), the processing is returns to step S01. If so on the other hand (YES in step S03), whether the velocity detecting portion 109 is turned on or not is determined (step S04).

If not (NO in step S04), the handover-start-condition determining portion 106 acquires an area threshold value $s_0$ stored in the memory portion 107, and the processing moves to step S07. If so on the other hand (YES in step S04), the velocity detecting portion 109 detects the velocity of travel of the mobile terminal 100 (step 505). The threshold correcting portion 108 gives the value corrected from the area threshold value $s_0$ stored in the memory portion 107 to the handover-start-condition determining portion 106 as the area threshold value $s_0$ (step S06).

Next, the area measuring portion 105 calculates a partial area $s(t_n)$ on the basis of Expression 1 (step S07) and acquires the accumulated value of the partial area $s(t_n)$, that is, the area s. Then, the area measuring portion 105 gives the area s to the handover-start-condition determining portion 106 (step S08).

The handover-start-condition determining portion 106 then compares the area s and the area threshold value $s_0$ and determines whether the area s is equal to or higher than the area threshold value $s_0$ or not (step S09). If not (NO in step S09), the control unit 103 adds one to the value of n and returns the processing to step S02. After that, processing at the next time $t_1$ is performed.

If so on the other hand (YES in step S09), the handover-start-condition determining portion 106 determines that the handover start condition is satisfied and starts the handover control portion 110. This executes handover from the base station 1 to the base station 2.

In steps S07 and S08 at the first round, that is, with n=0, the area is difficult to calculate normally. For example, area s may be output as zero in step S08. From the second round, normal area calculation is performed.

The order of the processes in steps S04 to S06 and processes in steps S07 and S08 in the flowchart may be changed. Alternatively, the processes may be performed in parallel.

When the mobile terminal 100 has the velocity detecting portion 109 implemented by an acceleration sensor, for example, the correction that gives a minus offset to the area threshold value $s_0$ may be performed by the threshold correcting portion 108 for the movement at a high velocity (when the velocity of travel is equal to or higher than a predetermined minus correction threshold value). Thus, the time for reaching the area threshold value can be reduced, and the handover start can be implemented more quickly.

Alternatively, when the mobile terminal 100 has a quasi-static or moves at a low velocity (when the velocity of travel is lower than the predetermined plus correction threshold value), the threshold correcting portion 108 may give a plus offset to the area threshold value $s_0$. Thus, the time for reaching the area threshold value can be extended, and control may be performed so as to suppress miss operations in handover start.

Figure 10:
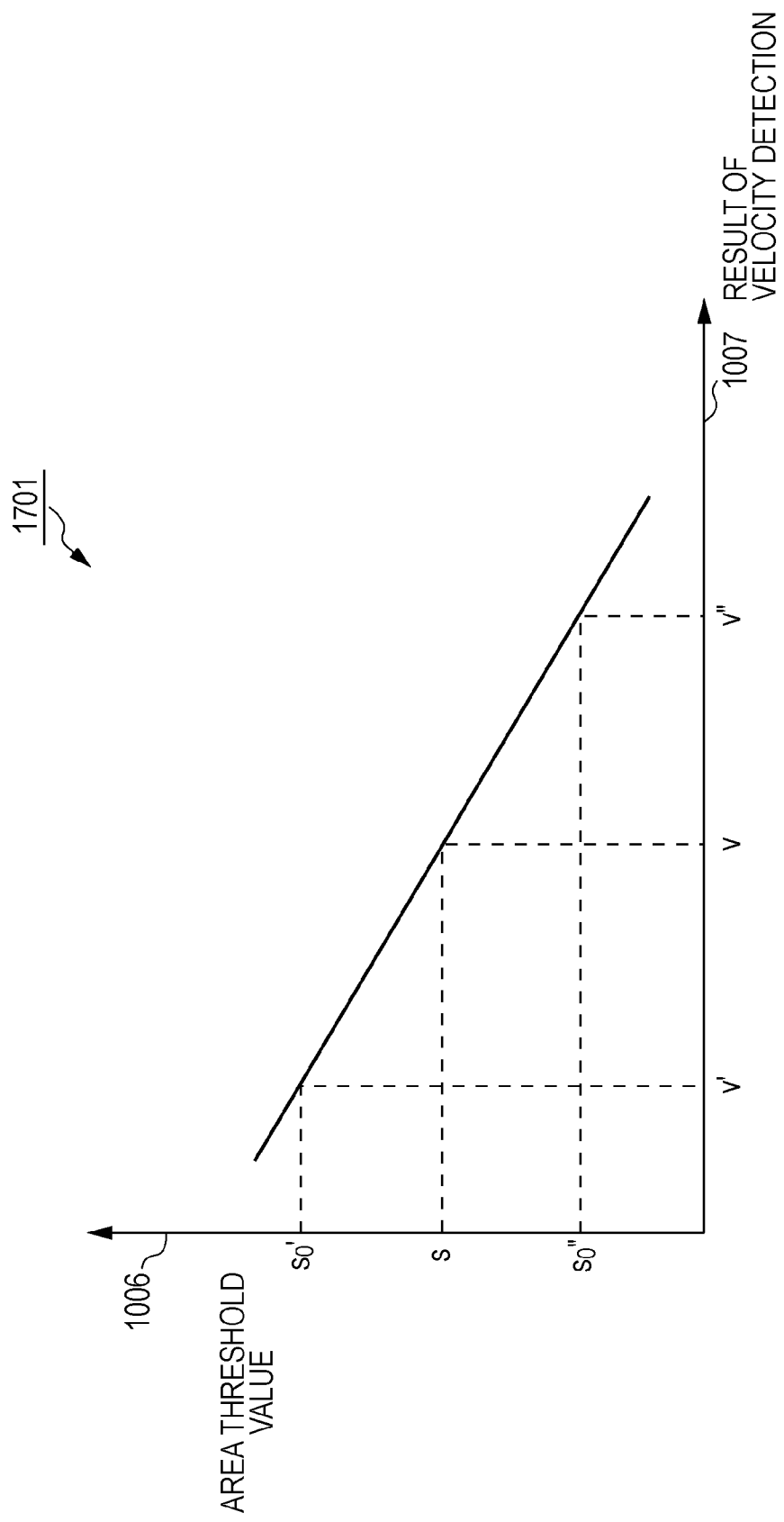
FIG. 10 illustrates an example of correction on an area threshold value in accordance with the result of velocity detection.

FIG. 10 illustrates an example in which the threshold correcting portion 108 corrects the area threshold value $s_0$ on the basis of the result of velocity detection by the velocity detecting portion 109. The reference value for the result of velocity detection is assumed as a reference value v. If the result of velocity detection is value v" that is higher than the reference value v, that is, if the movement at a high velocity is detected, the threshold correcting portion 108 gives a minus offset to the area threshold value $s_0$ read from the memory portion 107 to correct it to $s_0'$. If the result of velocity detection is a value v' that is lower than the reference value v, that is, if a quasi-static state or the movement at a low velocity is detected, the threshold correcting portion 108 gives a plus offset to the area threshold value $s_0$ to correct it to $s_0''$.

According to this embodiment, the area of the region enclosed by a signal quality waveform from the base station communicating, a signal quality waveform from a surrounding base station and a time straight line is calculated and accumulated. If the accumulated value exceeds a preset handover start condition, handover is started. In other words, control is performed so as to dynamically change the handover start condition in the time direction in accordance with the degrees of changes in receive signal quality from the base station communicating and a surrounding base station.

Thus, according to this embodiment, whether a handover start condition is satisfied or not is determined in accordance with the values regarding the area. Therefore, with rapid deterioration of the receive signal qualities from the base station communicating or rapid increase in receive signal quality from a surrounding base station, the handover start condition in the time direction is reduced. As a result, handover can be started early. On the other hand, with mild changes in receive signal qualities from the base station communicating and a surrounding base station, the handover start condition is extended in the time direction, and miss operations in handover can thus be prevented. Therefore, stable communication quality can be kept in accordance with the surrounding environment.

According to this embodiment, a handover start threshold value is set by using an area value. This can reduce the memory region for storing handover start threshold values for patterns of changes in various surrounding environment.

The handover control according to this embodiment is applicable to either one of handover processing between the same frequencies (intra-frequency handover processing), different frequencies (inter-frequency handover processing) and handover processing between different systems (inter-Radio Access Technology (RAT) handover processing).

The example has been described according to the aforementioned embodiment in which one base station 2 exists as a base station other than the base station communicating. However, when the mobile terminal 100 can receive signals from multiple surrounding base stations that are different from the base station communicating, the aforementioned area measurement and determination on a handover start condition may be performed for each of the surrounding base stations.

Having described according to the embodiment the case where the receive signal quality, that is, a quality parameter indicating a radio quality is a received power, a propagation loss or SIR is applicable instead of the received power. The mobile terminal 100 may further include an operating portion or interface for manipulating such a radio quality parameter.

All examples and conditional language recited herein are intended for pedagogical purposes to aid the reader in understanding the invention 30 and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A mobile terminal apparatus comprising:
a memory; and
a processor configured to, by executing a procedure in the memory,
measure a first signal quality and a second signal quality, the first signal quality being signal quality of a signal from a first wireless base station which is communicated with the mobile terminal apparatus, the second signal quality being a signal quality of a signal received by the mobile terminal apparatus from a second wireless base station, and
execute a handover from the first wireless base station to the second wireless base station when the first signal quality is lower than the second signal quality and an integration value, along the time axis, of a difference between the first and the second signal qualities is more than a predetermined value, the integration value being from a base point in time where the second signal quality becomes larger than the first signal quality to a time straight line.

2. The mobile terminal apparatus according to claim 1, wherein
the processor detects a moving speed of the mobile terminal apparatus,
and corrects the predetermined value on the basis of the detected moving speed.

3. A method for processing a handover of a mobile terminal configured to communicate with a first wireless base station and a second wireless base station, the method comprising:
measuring a first signal quality and a second signal quality, the first signal quality being signal quality of a signal from the first wireless base station which is communicated with the mobile terminal, the second signal quality being a signal quality of a signal received by the mobile terminal from the second wireless base station, and
executing, by a processor mounted on the mobile terminal, a handover from the first wireless base station to the second wireless base station when the first signal quality is lower than the second signal quality and an integration value, along the time axis, of a difference between the first and the second signal qualities is more than a predetermined value, the integration value being from a base point in time where the second signal quality becomes larger than the first signal quality to a time straight line.

4. The method for processing a handover of the mobile terminal according to claim 3 further comprising:
detecting a moving speed of the mobile terminal apparatus; and
correcting the predetermined value on the basis of the detected moving speed.

5. A mobile communication system comprising:
a first wireless base station that transmits a first signal;
a second wireless base station that transmit a second signal; and
a mobile terminal that
measures a first signal quality of the first signal and a second signal quality of the second signal when the mobile terminal is in communication with the first wireless base station; and
executes a handover from the first wireless base station to the second wireless base station when the first signal quality is lower than the second signal quality and an integration value, along the time axis, of a difference between the first and the second signal qualities is more than a given value, the integration value being from a base point in time where the second signal quality becomes larger than the first signal quality to a time straight line.

6. The mobile communication system according to claim 5, wherein
the mobile terminal obtains a moving speed of the mobile terminal apparatus, and corrects the given value based on the moving speed.

* * * * *